United States Patent [19]

Hamano

[11] Patent Number: 5,771,123
[45] Date of Patent: Jun. 23, 1998

[54] ZOOM LENS HAVING IMAGE STABILIZING FUNCTION

[75] Inventor: Hiroyuki Hamano, Yamato, Japan

[73] Assignee: Canon Kabushiki Kaisha, Tokyo, Japan

[21] Appl. No.: 806,233

[22] Filed: Feb. 24, 1997

[30] Foreign Application Priority Data

Feb. 27, 1996 [JP] Japan .................................. 8-039861

[51] Int. Cl.⁶ .................................................. G02B 27/64
[52] U.S. Cl. ........................... 359/557; 359/554; 359/686
[58] Field of Search .................................. 359/554–557, 359/676–678, 684–686, 831, 837; 396/52–55; 348/208

[56] References Cited

U.S. PATENT DOCUMENTS

| 4,927,250 | 5/1990 | Suda ........................................ 359/557 |
| 4,934,796 | 6/1990 | Sugiura et al. ........................... 359/676 |
| 4,998,809 | 3/1991 | Tsuji et al. ............................... 359/557 |
| 5,009,492 | 4/1991 | Hamano ................................... 359/686 |
| 5,134,524 | 7/1992 | Hamano et al. ......................... 359/687 |
| 5,138,492 | 8/1992 | Hamano et al. ......................... 359/684 |
| 5,140,462 | 8/1992 | Kitagishi ................................. 359/557 |
| 5,182,671 | 1/1993 | Kitagishi et al. ....................... 359/557 |
| 5,299,064 | 3/1994 | Hamano et al. ......................... 359/684 |
| 5,315,435 | 5/1994 | Horiuchi ................................. 359/554 |
| 5,430,576 | 7/1995 | Hamano ................................... 359/684 |
| 5,461,513 | 10/1995 | Maruyama ............................... 359/557 |
| 5,521,758 | 5/1996 | Hamano ................................... 359/557 |
| 5,546,230 | 8/1996 | Sato et al. ............................... 359/684 |
| 5,600,490 | 2/1997 | Sugawara et al. ....................... 359/690 |
| 5,661,597 | 8/1997 | Sugawara ................................ 359/557 |
| 5,677,792 | 10/1997 | Hamano ................................... 359/557 |

FOREIGN PATENT DOCUMENTS 4-21815   1/1992   Japan .
6-230317  8/1994   Japan .

Primary Examiner—Thong Nguyen
Attorney, Agent, or Firm—Fitzpatrick, Cella, Harper & Scinto

[57] ABSTRACT

A zoom lens comprises a plurality of lens units, in which at least one of lens unit separations in the plurality of lens units is varied to vary a focal length, an aperture stop, and a variable angle prism unit disposed on an image side of the aperture stop and having an apex angle varied to refract light, the zoom lens satisfying the following conditions:

$$1.16 < Lv/Fw < 3.90$$

$$6.2 < L1/Fw < 17.0$$

where Lv is a distance between the aperture stop and a driven surface of the variable angle prism unit, Fw is a focal length in a wide-angle end of the zoom lens, and L1 is a distance between the driven surface of the variable angle prism unit and a lens surface closest to an object side in the zoom lens.

8 Claims, 10 Drawing Sheets

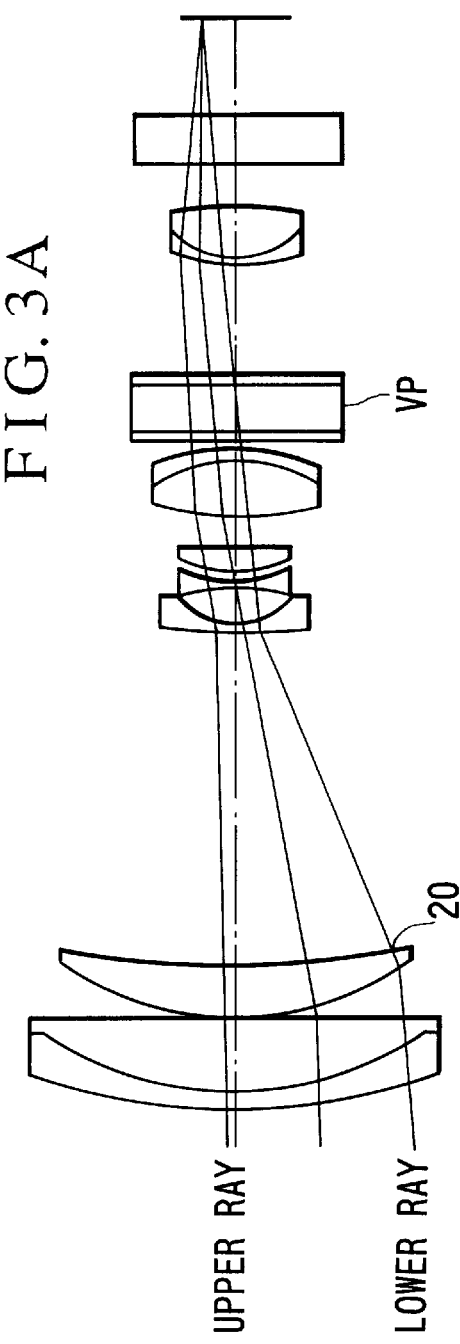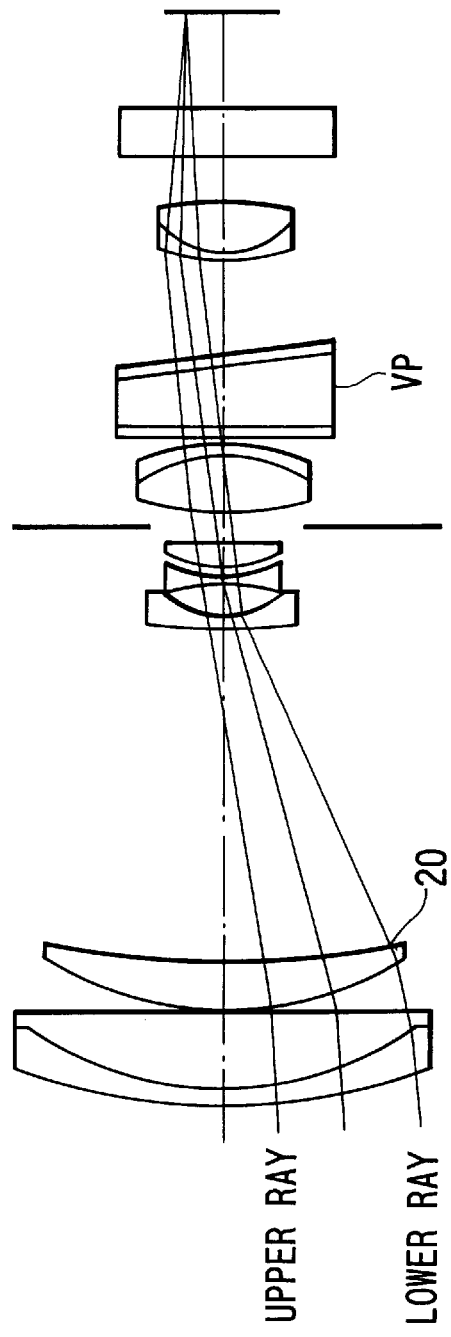

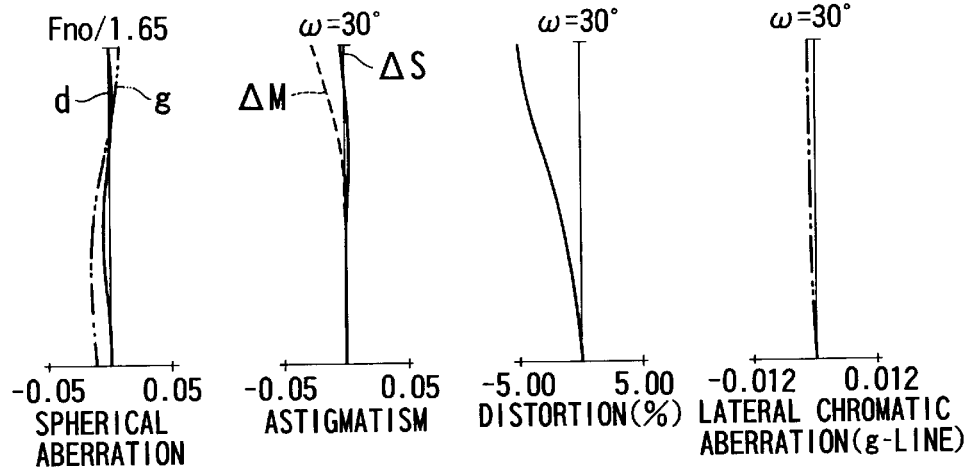
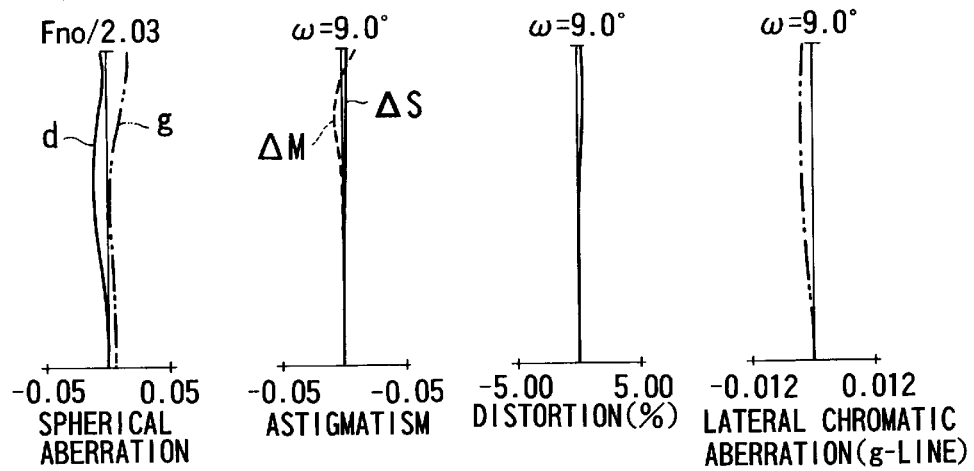
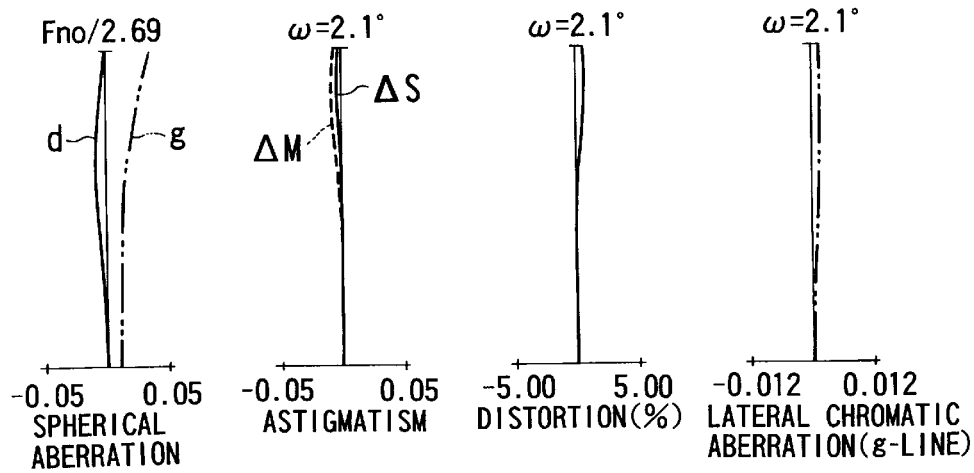

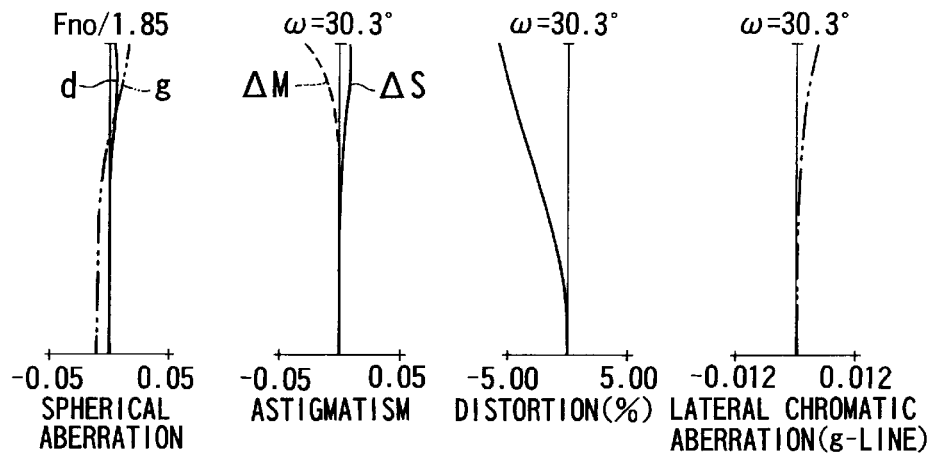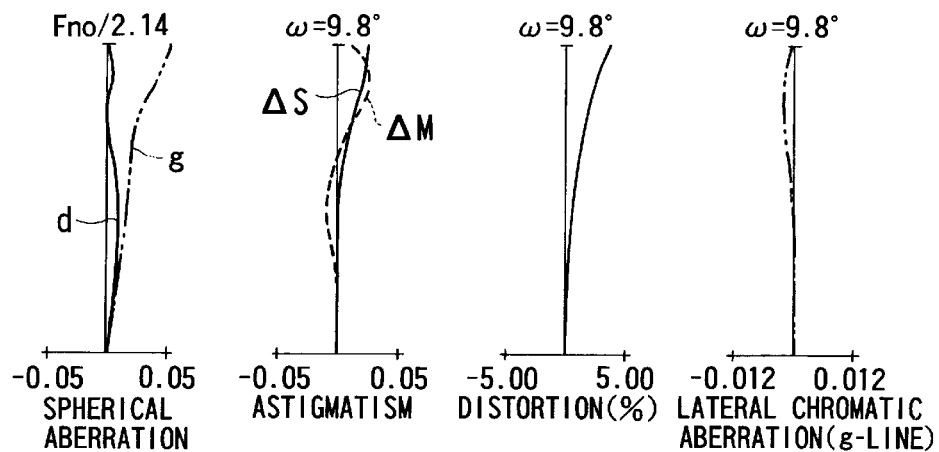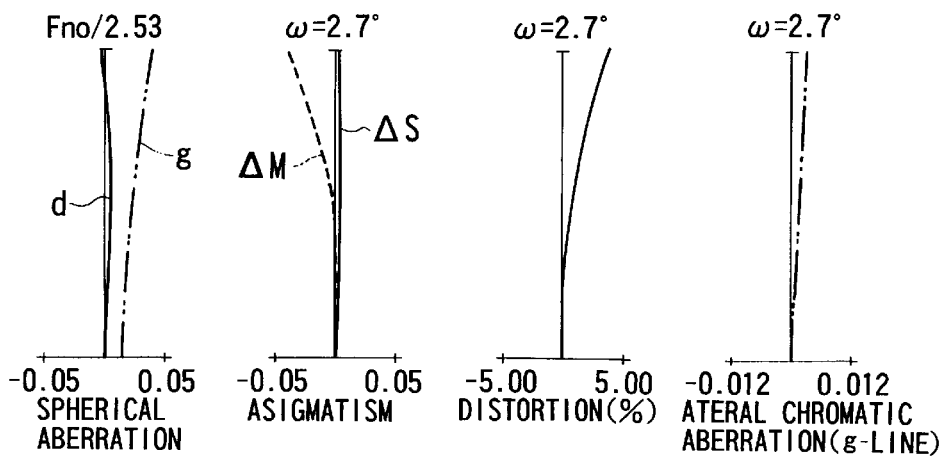

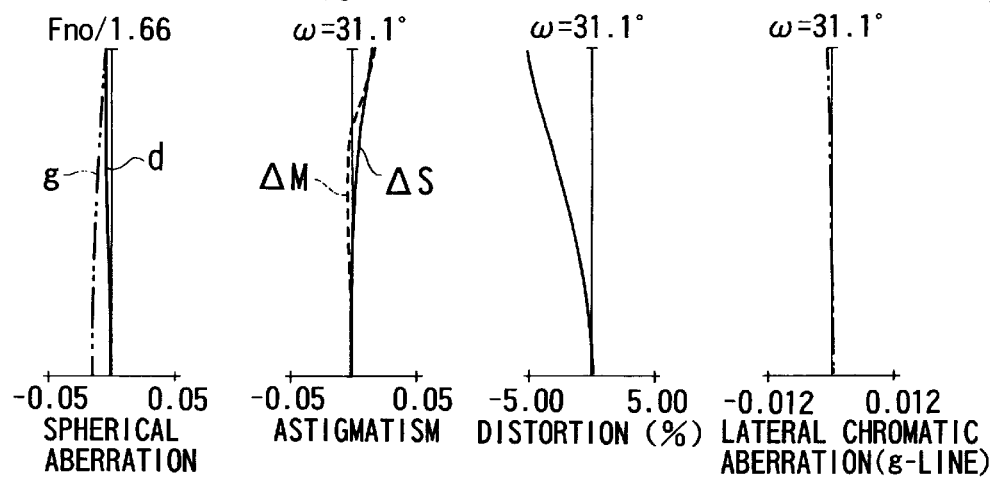
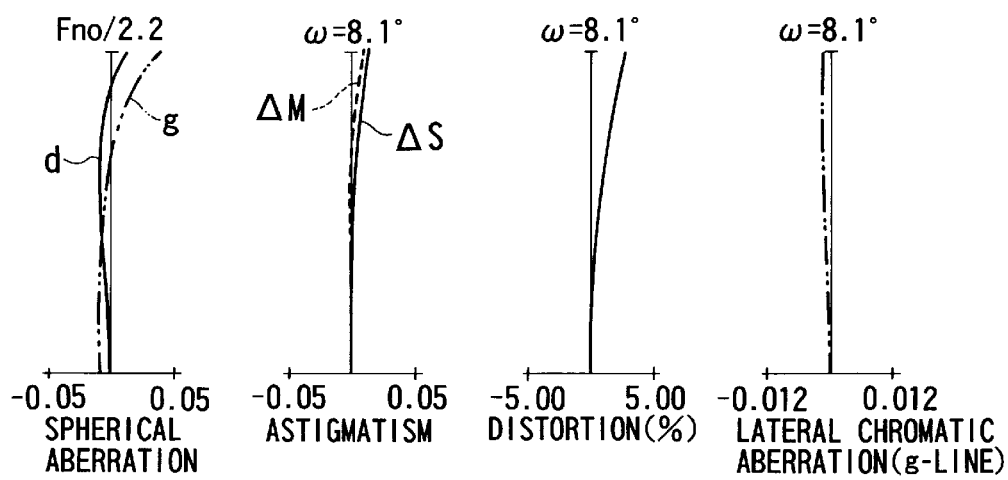
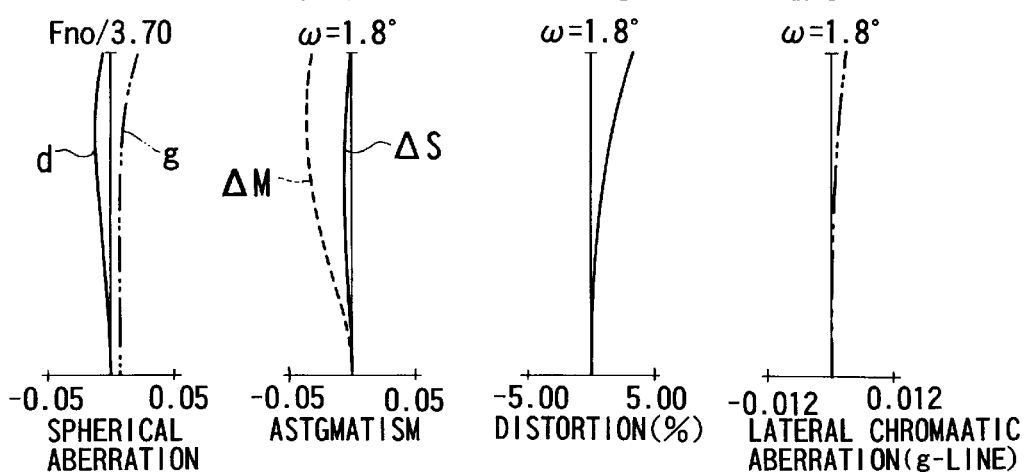

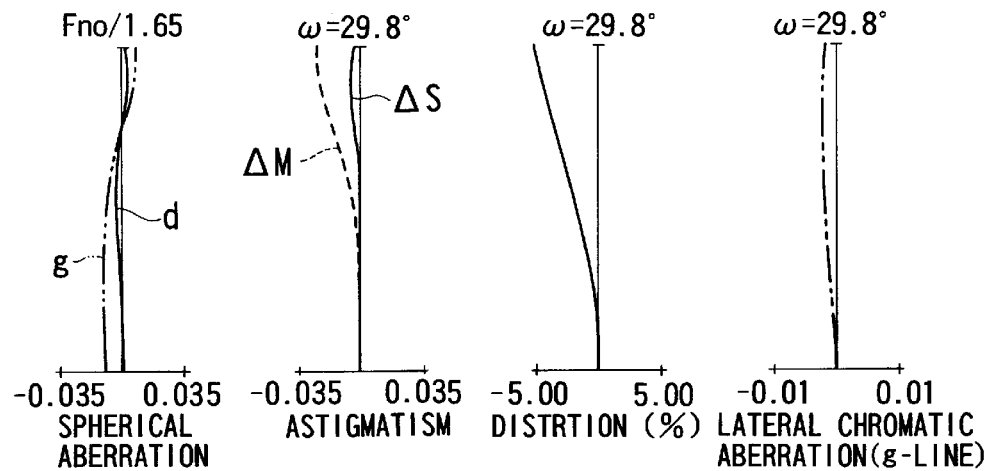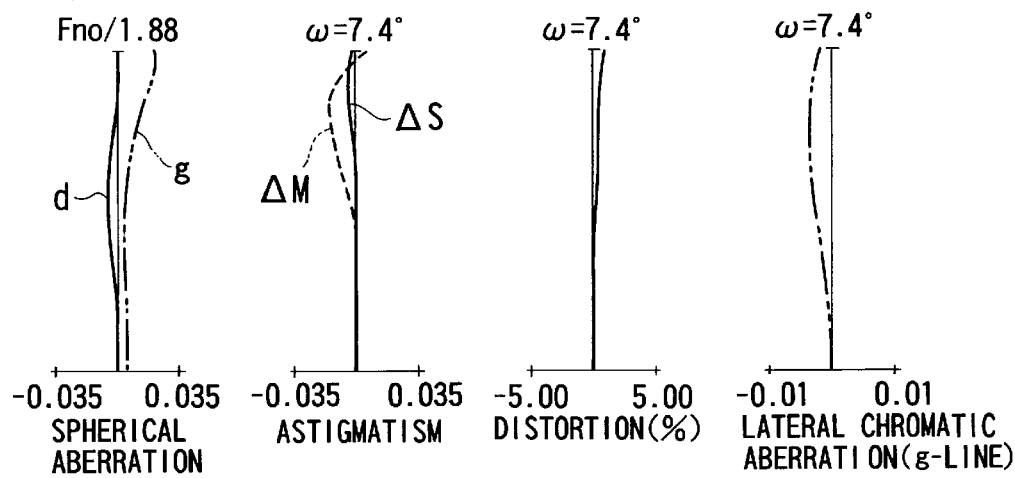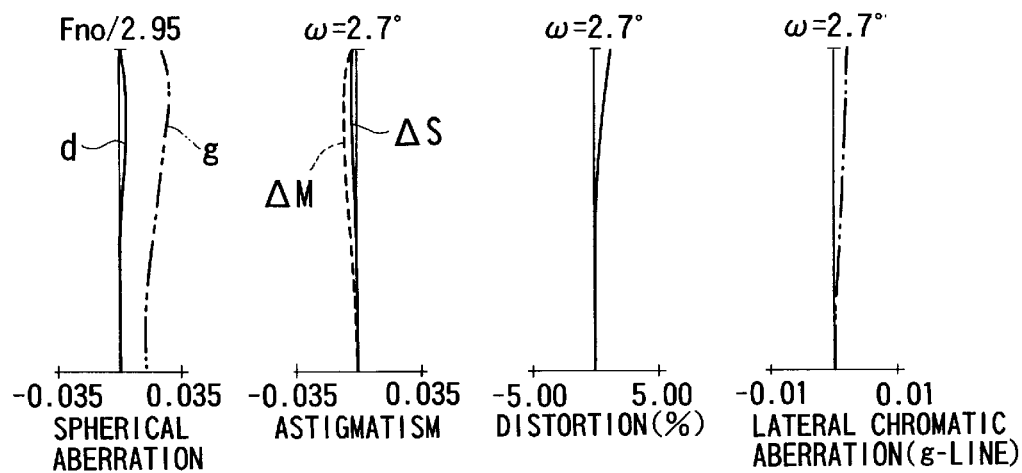

ZOOM LENS HAVING IMAGE STABILIZING FUNCTION

BACKGROUND OF THE INVENTION

1. Field of the Invention

This invention relates to zoom lenses having the image stabilizing function and, more particularly to such zoom lenses which have a zoom ratio of not less than 12 with the bulk and size thereof minimized, while still permitting a good optical performance to be maintained stable, suited to video cameras or photographic cameras.

2. Description of Related Art

When the photographer on a running car, a sailing ship or a flying airplane takes shots, or when the photographer takes shots while walking, the photographed image tends to be subjected to intensive vibrations, so that the quality of the photographed image is greatly deteriorated. Particularly in the case of motion pictures or long exposure times, therefore, an effective image is hardly obtainable.

It is general practice that when taking a photograph with the lens of long focal length mounted the single-lens reflex camera, the photographer fixes the camera on a steady base, usually, on a tripod. However, since this sacrifices the movability of the camera, many photographic situations are encountered where the photographer is obliged to hold the camera by his or her hand. In some occasions, because of an image shake caused by the vibration of the photographer's hand, good pictures will not be taken. Also, in recent years, video cameras are developed whose taking lens is ever becoming higher in the magnifying power. Along with this, the problem of the inability to take good pictures is becoming ever more serious.

To prevent occurrence of such an image shake, a variety of so-called image stabilizing optical systems have been proposed. For example, there is well known a variable magnification optical system in which a bellows having a transparent liquid of certain refractive index sealed therein is disposed in front of the photographic lens, and a variable angle prism constituted by the bellows and the transparent liquid are operated to control an angle made by an entrance surface and an exit surface of the bellows, so that the tilted angle of the photographic lens is corrected.

However, as the zoom ratio of the photographic lens increases, the diameter of the front lens members increases. Since the variable angle prism lies in front of the photographic lens, its diameter has to increase unduly largely.

To solve this problem, in Japanese Laid-Open Patent Applications Nos. Hei 4-21815 and Hei 6-230317, etc., there has been proposed a variable magnification optical system in which the variable angle prism is disposed inside the optical system. This arrangement produces an advantage that the variable angle prism itself can be reduced in the diameter, which is favorable for the frequency characteristic during the image stabilizing operation.

However, in the above Japanese Laid-Open Patent Application No. Hei 4-21815, there is no description about the specification of the construction and arrangement of the constituent lenses and of the precise definition of a place the variable angle prism should take, although the refractive power arrangement is suggested. The other Japanese Laid-Open Patent Application No. Hei 6-230317 suggests a lens with each component weakened in the refractive power, so that the lens system becomes very large.

In general, if the variable angle prism is disposed inside the optical system, various problems arise in that an increase of the diameter of the front lens members is necessitated in order to secure the amount of marginal light during the image stabilizing operation, or the amount of marginal light is varied during the image stabilizing operation, or decentering aberrations such as decentering coma and decentering field curvature are produced to deteriorate the optical performance.

Further, since the relationship between an angle of incidence of a light ray on the first lens surface of the optical system and an apex angle of the variable angle prism is varied depending on the refractive power arrangement of lens components disposed on the object side of the variable angle prism, where to arrange the variable angle prism must be considered as an important factor. Otherwise, another problem arises in that the required angle for a necessary range of the image stabilization to move the variable angle prism becomes too much large.

BRIEF SUMMARY OF THE INVENTION

It is an object of the invention to provide a zoom lens having an image stabilizing function, in which a variable angle prism unit is adequately disposed inside a zoom optical system so as to correct well an image shake caused when the zoom optical system has tilted due to vibrations, and the zoom optical system as a whole is minimized in size.

In accordance with one aspect of the invention, there is provided a zoom lens which comprises a plurality of lens units, in which at least one of lens unit separations in the plurality of lens units is varied to vary a focal length, an aperture stop, and a variable angle prism unit disposed on an image side of the aperture stop and having an apex angle varied to refract light, the zoom lens satisfying the following conditions:

$$1.16 < Lv/Fw < 3.90 \quad (1)$$

$$6.2 < L1/Fw < 17.0 \quad (2)$$

where $Lv$ is a distance between the aperture stop and a driven surface of the variable angle prism unit, $Fw$ is a focal length in a wide-angle end of the zoom lens, and $L1$ is a distance between the driven surface of the variable angle prism unit and a lens surface closest to an object side in the zoom lens.

With regard to a ray of light which passes through a center of the variable angle prism unit and advances in parallel to an optical axis, letting an angle of incidence of the ray of light on the variable angle prism unit be denoted by $\theta 1$, an angle of incidence of the ray of light on the lens surface closest to the object side in the zoom lens be denoted by $\theta 2$, and a ratio of the angle $\theta 2$ to the angle $\theta 1$ be denoted by $\gamma$, the zoom lens further satisfies the following condition:

$$0.15 < \gamma < 0.45$$

where $\gamma = \theta 2/\theta 1$.

Another feature of the zoom lens is that a distance S1 between the lens surface closest to the object side in the zoom lens and the aperture stop satisfies the following condition:

$$5.0 < S1/Fw < 15.0.$$

Another feature of the zoom lens is that the plurality of lens units include, in order from the object side, a first lens unit having a positive refractive power, a second lens unit having a negative refractive power, a third lens unit having a positive refractive power and a fourth lens unit having a positive refractive power, wherein the variable angle prism unit is disposed between the third lens unit and the fourth lens unit, the focal length is varied by moving at least the second lens unit and the fourth lens unit, and focusing is performed by moving the fourth lens unit.

Alternatively, the plurality of lens units include, in order from the object side, a first lens unit having a positive refractive power, a second lens unit having a negative refractive power, a third lens unit having a positive refractive power, a fourth lens unit having a positive refractive power and a fifth lens unit having a negative refractive power, wherein the variable angle prism unit is disposed between the third lens unit and the fourth lens unit, the focal length is varied by moving at least the second lens unit and the fourth lens unit, and focusing is performed by moving the fourth lens unit.

Alternatively, the plurality of lens units include, in order from the object side, a first lens unit having a positive refractive power, a second lens unit having a negative refractive power, a third lens unit having a positive refractive power, a fourth lens unit having a negative refractive power and a fifth lens unit having a positive refractive power, wherein the focal length is varied by moving at least the second lens unit and the fourth lens unit, and focusing is performed by moving the fourth lens unit, and wherein the variable angle prism unit is disposed inside the third lens unit.

Another feature of the zoom lens is that a focal length F2 of the second lens unit satisfies the following condition:

$$0.2 < |F2/\sqrt{Fw \cdot Ft}| < 0.45$$

where Ft is a focal length in a telephoto end of the zoom lens.

These and further objects and features of the invention will become apparent from the following detailed description of the preferred embodiments thereof taken in conjunction with the accompanying drawings.

BRIEF DESCRIPTION OF THE SEVERAL VIEWS OF THE DRAWING

FIGS. 3A and 3B are diagrams of geometry for explaining a change of the amount of light resulting from the image stabilizing operation.

FIGS. 6A-1 to 6A-4, FIGS. 6B-1 to 6B-4 and FIGS. 6C-1 to 6C-4 are graphic representations of the aberrations of the zoom lens of the numerical example 1.

FIGS. 7A-1 to 7A-4, FIGS. 7B-1 to 7B-4 and FIGS. 7C-1 to 7C-4 are graphic representations of the aberrations of the zoom lens of the numerical example 2.

FIGS. 8A-1 to 8A-4, FIGS. 8B-1 to 8B-4 and FIGS. 8C-1 to 8C-4 are graphic representations of the aberrations of the zoom lens of the numerical example 3.

FIGS. 9A-1 to 9A-4, FIGS. 9B-1 to 9B-4 and FIGS. 9C-1 to 9C-4 are graphic representations of the aberrations of the zoom lens of a numerical example 4 of the invention.

DETAILED DESCRIPTION OF THE INVENTION

Figure 1:
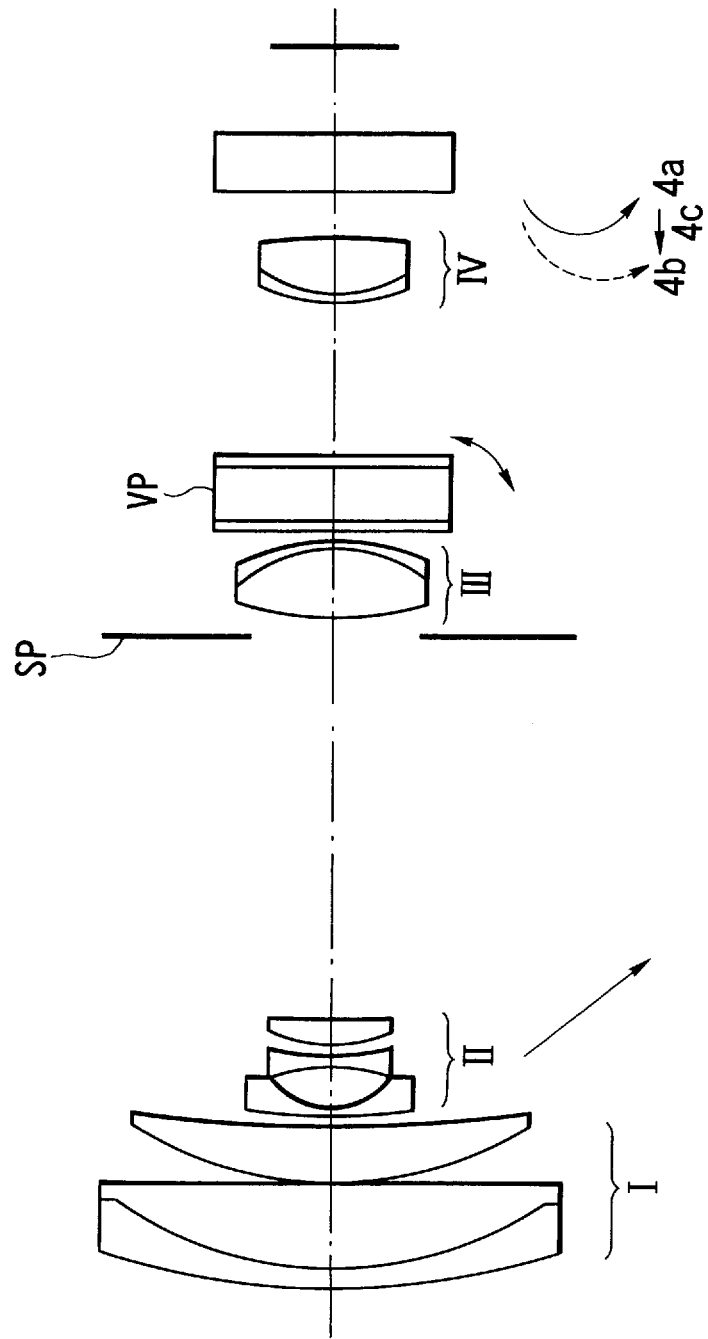
FIG. 1 is a sectional view of a numerical example 1 of a zoom lens according to the invention.

FIG. 1 is a block diagram showing a numerical example 1 of the zoom lens of the invention. In FIG. 1, the zoom lens includes a first lens unit I of positive refractive power, a second lens unit II of negative refractive power, a third lens unit III of positive refractive power and a fourth lens unit IV of positive refractive power. A variable angle prism unit VP is disposed closer to the image side than an aperture stop SP.

During zooming from the wide-angle end to the telephoto end, as shown by the arrows, at least the second lens unit II is moved toward the image side, while simultaneously the fourth lens unit IV is moved to compensate for the image shift with variation of the focal length. In such a manner, at least one of separations between adjacent two of the lens units is made variable for varying the focal length. The other lens units remain stationary.

The fourth lens unit IV is also made to axially move for focusing purposes. That is, the rear focusing method is employed. A curved solid line 4a and a curved dashed line 4b in FIG. 1 show the loci of motion of the fourth lens unit IV for compensating for the image shift with zooming from the wide-angle end to the telephoto end when focusing on an infinitely distant object and a close object, respectively.

In connection with the numerical example 1, it is to be noted that the first lens unit I and the third lens unit III remain stationary during zooming and during focusing. However, to reduce the contribution of the second lens unit II to the variation of the focal length, at least the first lens unit I may otherwise be made to move.

In the numerical example 1, compensation for the image shift with zooming is performed by moving the fourth lens unit IV, and focusing is also performed by moving the fourth lens unit IV. In particular, as shown by the curved lines 4a and 4b in FIG. 1, the total loci of zooming movement from the wide-angle end to the telephoto end are made convex toward the object side. This assures efficient utilization of the space between the third lens unit III and the fourth lens unit IV, thus achieving a much desired shortening of the total length of the entire lens system.

In the numerical example 1, at the setting in, for example, the telephoto end, when focusing from an infinitely distant object to a close object, the fourth lens unit IV moves forward as shown by a straight line 4c in FIG. 1.

Figure 2:
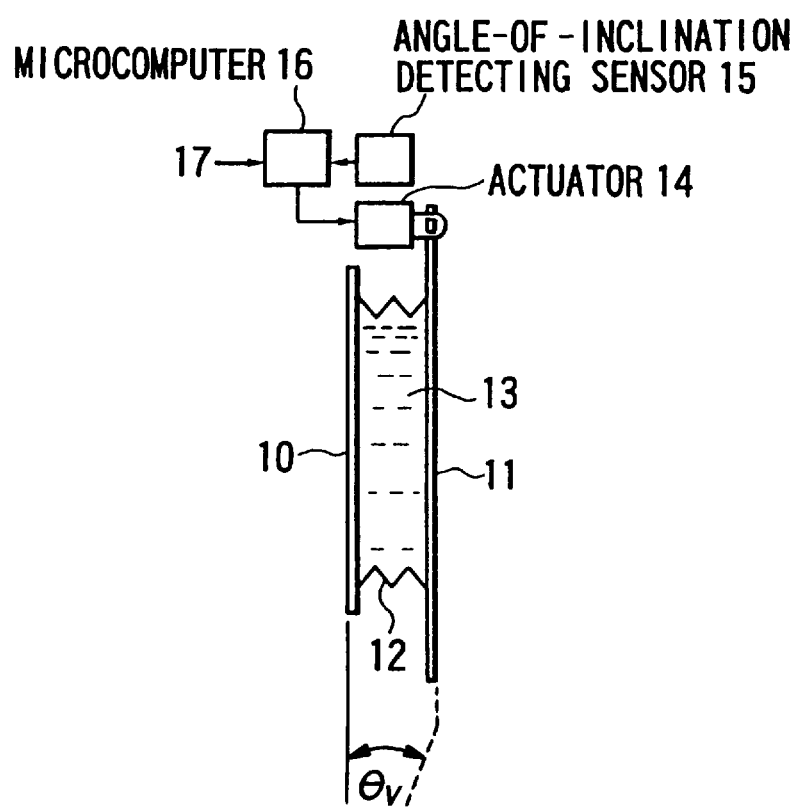
FIG. 2 is a sectional view, partly in block form, showing the structure of construction of the variable angle prism unit.

The variable angle prism unit VP is shown in enlarged scale in FIG. 2 together with a drive portion for driving the variable angle prism VP. An entrance plate 10 and an exit plate 11 are mounted to either end of a foldable thin film tube 12 such as a bellows and each have the property of transmitting light. The end plates 10 and 11 and the thin film tube 12 form a space which is filled with a liquid 13 of a desired refractive index having the light permeable property and tightly sealed. Accordingly, as, for example, the entrance end plate 10 is fixed, when pressure is applied to the exit end plate 11 at a portion of the margin, the exit end plate 11 tilts, so that an optical wedge of apex angle θv is thus formed.

An actuator 14 has its driving shaft in flexible connection with the exit end plate 11. Although, in FIG. 2, the actuator 14 is shown one in number, three items, for example, are assumed to be used in 120° spaced relation around the optical axis so that the optical wedge can orient to all radial directions. An angle-of-inclination detecting sensor 15 is arranged to detect the tilted angle of the zoom lens. For this purpose, a gyro or like acceleration sensor is also usable. The angle-of-inclination detecting sensor 15, too, is assumed to be plural in number so that tilting of the zoom lens in any direction can be detected. A microcomputer 16 is arranged to compute the amount of driving of each actuator 14 on the basis of the output of each angle-of-inclination detecting sensor 15 and zooming information 17 obtained by taking into account the layout position of the variable angle prism unit VP, and to output a signal representing the amount of driving of the variable angle prism VP. Each actuator 14 is controlled by the output signal of the microcomputer 16. Incidentally, the thin film tube 12 may be made up from an elastic resin sheet.

To allow a variable angle prism unit to be inserted into the interior of the zoom lens, it is necessary to secure so much a space the variable angle prism occupies, as compared with the conventional zoom lens. If the variable angle prism unit is disposed before the stop, the distance between the stop and the front lens unit increases by that amount, and the entrance pupil, too, becomes longer, so that the front lens members become greater. It is, therefore, preferable to dispose the variable angle prism unit behind the stop.

In a case where the variable angle prism unit is disposed on the object side of a photographic optical system, as in general, although the size of the optical system becomes large, the amount of marginal light does not change even if the variable angle prism unit is operated to decenter, since the amount of marginal light is determined only by the effective diameter of the optical system. On the other hand, in a case where the variable angle prism unit is disposed inside the photographic optical system, since a marginal bundle of rays is determined by those lens units which lie before the variable angle prism unit, the amount of marginal light changes when an incident bundle of rays is bent by the variable angle prism unit during the image stabilizing operation. In the case of taking still pictures, this does not matter provided a more amount of light than a certain level is permitted to enter. In the case of taking motion pictures, on the other hand, regardless of however large the absolute value of the amount of light may be, if a change of the amount of light is large, that change becomes conspicuous.

Figure 10:
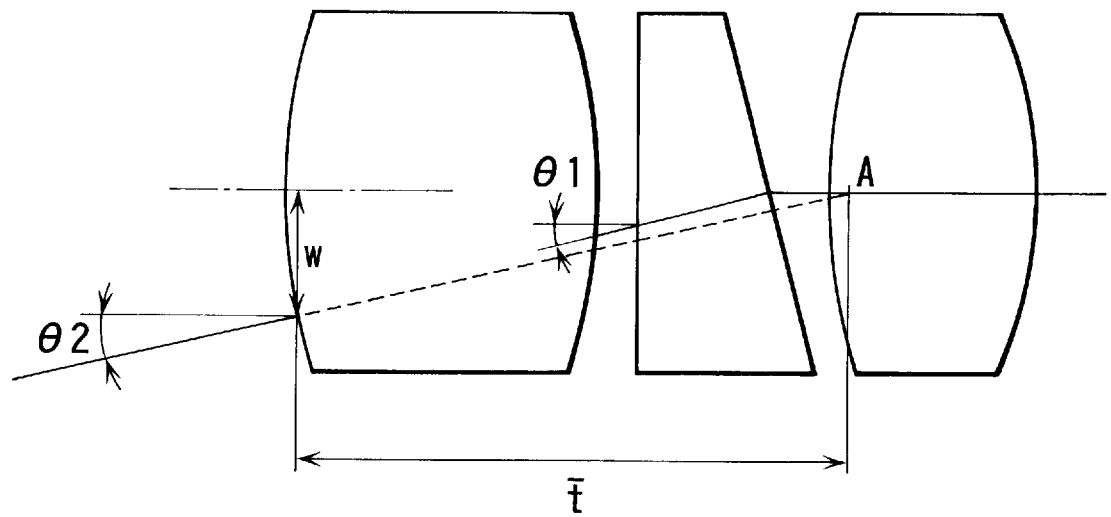
FIG. 10 is a diagram of geometry for explaining the angles of incidence of a ray of light on the zoom lens and on the variable angle prism unit according to the invention.

Explanation about this phenomenon will be made by using FIGS. 3A and 3B. FIG. 3A shows a situation when the exit end plate of the variable angle prism unit VP is not tilted, and FIG. 3B shows a situation when the exit end plate of the variable angle prism unit VP is tilted. When the exit end plate of the variable angle prism unit VP is tilted, a ray of light is deflected according to the tilting of the exit end plate. Since a lower ray of the marginal bundle is determined by an edge 20 of the optical system, the ray is bent to reduce the upper bundle, thereby causing the amount of light to change accordingly. Then, in the present embodiment, as shown in FIG. 10, with regard to a ray which passes through the center of the variable angle prism unit and advances in parallel to an optical axis, letting an angle of incidence of the ray on the variable angle prism unit be denoted by $\theta 1$, an angle of incidence of the ray on a frontmost lens surface (first lens surface) of the zoom lens be denoted by $\theta 2$, and a distance in the direction of the optical axis between a point A at which a line extending from a ray incident on the frontmost lens surface of the zoom lens intersects the optical axis and a point at which the ray is incident on the frontmost lens surface be denoted by $\bar{t}$, the height w from the optical axis of the ray incident on the frontmost lens surface is expressed as follows:

$$w = \bar{t} \cdot \tan \theta 2$$

As is understandable from this, to minimize a change of the amount of light during the image stabilizing operation, the distance $\bar{t}$ should be reduced. In order to reduce the distance $\bar{t}$, there is need to set forth proper ranges for the distances Lv and L1 from the driven surface of the variable angle prism unit to the aperture stop and the first lens surface of the zoom lens, respectively.

Therefore, according to the invention, the distance $\bar{t}$ is minimized so as to satisfy the following conditions (1) and (2), so that a change of the amount of light during the image stabilizing operation is thus lessened and, at the same time, the increasing of the diameter of the front lens members is suppressed:

$$1.16 < Lv/Fw < 3.90 \tag{1}$$

$$6.2 < L1/Fw < 17.0 \tag{2}$$

where Fw is a focal length in the wide-angle end of the zoom lens.

The inequalities of condition (1) are concerned with the distance Lv between the driven surface of the variable angle prism unit (the front surface of the exit end plate of the variable angle prism unit) and the aperture stop. When the distance Lv between the variable angle prism unit and the stop becomes shorter exceeding the lower limit of the condition (1), it becomes difficult to lay out the actuator for the variable angle prism unit and the actuator for the stop without occurrence of mechanical interference between them. Conversely when the upper limit is exceeded, as it implies that the height at which the principal ray passes through the variable angle prism unit rises, the curvature of field and other aberrations become worse during the image stabilizing operation.

The inequalities of condition (2) are concerned with the distance L1 between the first lens surface of the zoom lens and the driven surface of the variable angle prism unit. When the lower limit of the condition (2) is exceeded, as this means that the distance L1 takes too small a value, there is an advantage for reducing a change of the amount of light, but the variable angle prism unit becomes too much large in size, because it is disposed too ahead. When the upper limit is exceeded, as this means that the distance $\bar{t}$ is too long, a change of the amount of light during the image stabilizing operation increases objectionably.

Next, in a case where the variable angle prism unit is disposed inside the zoom lens, the required angle to move the variable angle prism unit varies, depending on the position of the variable angle prism unit and the refractive power arrangement of the zoom lens. This is explained in more detail below.

Now assuming that the image stabilizing operation is performed in the telephoto end, with regard to a ray of light which passes through the center of the variable angle prism unit and advances in parallel to the optical axis, letting an angle of incidence of the ray of light on the variable angle prism unit be denoted by $\theta 1$, an angle of incidence of the ray of light on the first lens surface of the zoom lens be denoted by $\theta 2$, a ratio of the angle $\theta 2$ to the angle $\theta 1$ be denoted by $\gamma$, a refractive index of the fluid of the variable angle prism unit be denoted by Nv, an apex angle of the variable angle prism unit be denoted by $\theta v$, and an angle of inclination of the zoom lens detected by the angle-of-inclination detecting sensor be denoted by $\theta c$, the following equations are obtained:

$$\theta 1 = \theta v \cdot (Nv - 1)$$

$$\gamma = \theta 2/\theta 1$$

Accordingly, if the apex angle $\theta v$ is determined based on $$\theta v = c/(\gamma \cdot (Nv-1)) \qquad (6),$$

the following equation is obtained:

$$\theta 2 = \theta c,$$

so that the angle of inclination $\theta c$ of the zoom lens and the angle of incidence $\theta 2$ are thus brought into coincidence with each other to perform the image stabilizing operation.

Here, the ratio $\gamma$ is a constant determined by the refractive power arrangement of those lens units which lie on the object side of the variable angle prism unit.

In the above discussion, the telephoto end is taken into consideration. As the variable magnification optical system varies the focal length, the ratio $\gamma$ varies. For the varied ratio $\gamma$, therefore, the apex angle $\theta v$ of the variable angle prism unit is made to vary according to the equation (6). In other words, in a case where the variable angle prism unit is disposed before the zoom section of the optical system, the relationship between the angle to correct for stabilization of the image and the apex angle of the variable angle prism unit is constant irrespective of the variation of the focal length. In another case where the variable angle prism unit is disposed behind the zoom section, however, that relationship varies with zooming.

According to the invention, in order to minimize the angle of driving of the variable angle prism unit required for the image stabilizing operation, with regard to a ray of light which passes through the center of the variable angle prism unit and advances in parallel to the optical axis, the angle of incidence $\theta 1$ of the ray on the variable angle prism unit and the angle of incidence $\theta 2$ of the ray on the first lens surface of the zoom lens satisfy the following condition:

$$0.15 < \gamma < 0.45 \qquad (3)$$

where $\gamma = \theta 2/\theta 1$.

The inequalities of condition (3) are concerned with the angular magnification of those lens units which lie before the variable angle prism unit. When the ratio $\gamma$ is too small beyond the lower limit of the condition (3), the required angle for the image stabilizing operation to move the variable angle prism unit increases objectionably. When the upper limit is exceeded, as this implies that the angle to move the variable angle prism unit is decreased too much in the middle region of the zooming range, it becomes difficult to control the image stabilizing operation.

Further, letting a distance between the frontmost lens surface (first lens surface) of the zoom lens and the aperture stop be denoted by S1, an additional condition is set forth as follows:

$$5.0 < S1/Fw < 15.0 \qquad (4)$$

When this condition is satisfied, increasing of the diameter of the front lens members is suppressed.

When the distance S1 is too large exceeding the upper limit of the condition (4), the diameter of the front lens members increases objectionably. Conversely when attempts are made to reduce the distance S1 from the lower limit, it results in some cases that the diameter of the rear lens members increases and in other cases that the difficulty of correcting off-axial aberrations increases.

In the zoom lens of the present embodiment, the variable angle prism unit is disposed in between the third lens unit and the fourth lens unit, which is advantageous even at the points of the total length and the diameter of the front lens members. If the variable angle prism unit is otherwise disposed in between the first lens unit and the second lens unit, it would become difficult to satisfy the condition (4). So, increasing of the diameter of the front lens members would be unavoidable. Alternatively, if the variable angle prism unit is disposed in between the second lens unit and the third lens unit, then because the rays strongly diverge behind the second lens unit, there would be a disadvantage at shortening the total length of the zoom lens. Again, if the variable angle prism unit is disposed behind the fourth lens unit, the back focal distance should be considerably elongated and other problems would arise. In the numerical example 1 of the embodiment, on the other hand, as applied to the 4-unit zoom lens of plus-minus-plus-plus power arrangement, the space between the third lens unit and the fourth lens unit is vacant to some extent. So, the dead part of this space can be utilized effectively. This is advantageous even at the point of the total length of the zoom lens. Also, from the standpoint of correcting aberrations, it is most desirable to dispose the variable angle prism unit in between the third lens unit and the fourth lens unit.

Figure 4:
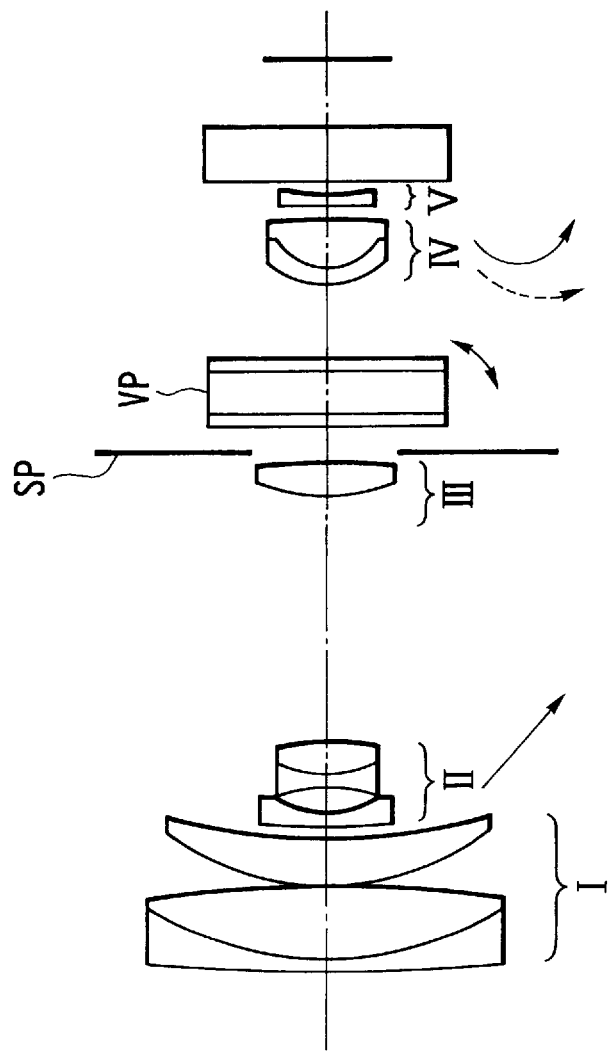
FIG. 4 is a sectional view of a numerical example 2 of a zoom lens according to the invention.

Another numerical example 2 of the invention is shown in the block diagram of FIG. 4. V denotes the fifth lens unit having a negative refractive power. Incidentally, the lens units I to the IV perform similar functions to those in the numerical example 1 described above. In the numerical example 2, the fourth lens unit IV is further followed by the fifth lens unit V. So, the rear section constituted by the fourth lens unit IV and the fifth lens unit V is formed to the telephoto type, thus making it possible to further shorten the total length of the zoom lens.

Also, the position sensitivity of the fourth lens unit IV becomes higher. Therefore, a smaller movement of the fourth lens unit IV suffices for focusing and for compensating for the image shift with zooming, thereby producing an advantage of shortening the overall physical length of those lens units which lie behind the stop.

In the case of the type having five constituent lens units as the numerical example 2, to achieve production of a more powerful effect of shortening the overall physical length of those lens units which lie behind the stop, it is preferable that a magnification $\beta 5$ for an infinitely distant object of the fifth lens unit V falls within the following range:

$$1.15 < \beta 5 < 1.6 \qquad (7)$$

When the magnification of the fifth lens unit is weaker than the lower limit of the condition (7), no sufficient effect of shortening the zoom lens is obtained. Conversely when the refractive power of the fifth lens unit is too strong in the negative sense as exceeding the upper limit, the Petzval sum increases greatly in the negative sense, and it becomes difficult to correct field curvature.

The astigmatism and distortion can be also corrected with high efficiency by introducing an aspheric surface or surfaces into the fifth lens unit.

Figure 5:
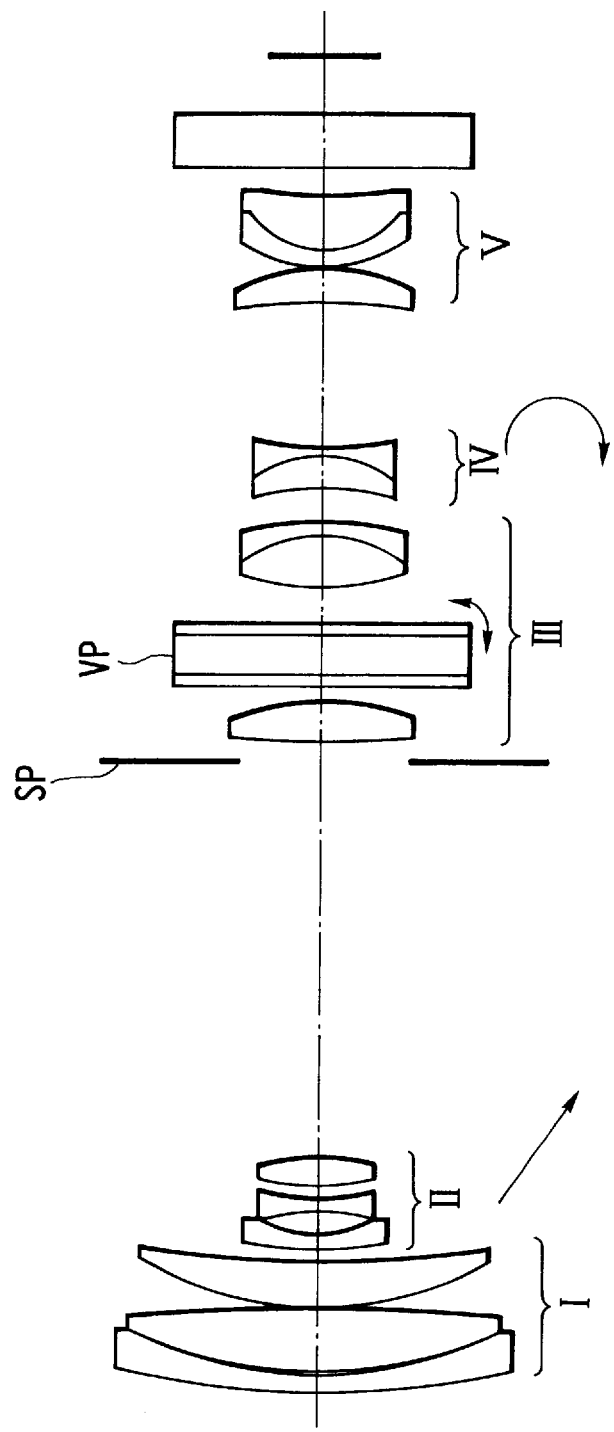
FIG. 5 is a sectional view of a numerical example 3 of a zoom lens according to the invention.

Still another numerical example 3 of the invention is shown in the block diagram of FIG. 5. The zoom lens includes a first lens unit I of positive refractive power, a second lens unit II of negative refractive power, an aperture stop SP, a third lens unit III of positive refractive power, a fourth lens unit IV of negative refractive power and a fifth lens unit V of positive refractive power arranged in this order from the object side. VP denotes a variable angle prism unit.

During zooming from the wide-angle end to the telephoto end, as shown by the arrows, at least the second lens unit is moved toward the image side, while simultaneously the fourth lens unit is moved to compensate for the image shift with variation of the focal length. The fourth lens unit is also moved axially to effect focusing. That is, the rear focusing method is employed.

Such a zoom configuration, though becoming larger in the number of lens elements than the 4-unit type, has a feature that the focal length varies at a higher rate in the middle region of the zooming range than that of the 4-unit zoom lens. Therefore, the zooming range can be increased with the limitation of the increase of the diameter of the front lens members to a minimum.

In the numerical example 3, the variable angle prism unit VP is disposed inside the third lens unit III. If the variable angle prism unit VP is disposed in between the third lens unit III and the fourth lens unit IV, it becomes difficult to satisfy the condition (1) or (2). In addition, the height at which the rays pass through the variable angle prism unit becomes higher, causing the decentering field curvature to increase objectionably during the image stabilizing operation.

Further, in the zoom lens according to the invention, the physical length of the zoom section is shortened to assure achievement of a further shortening of the total length of the entire system. For this purpose, it is preferable that the focal length F2 of the second lens unit satisfies the following condition:

$$0.2 < |F2/\sqrt{Fw \cdot Ft}| < 0.45 \quad (5)$$

where Ft is a focal length in the telephoto end of the zoom lens.

The inequalities of condition (5) are concerned with the refractive power of the second lens unit and have an aim to obtain a predetermined zoom ratio with high efficiency while still permitting the variation with zooming of the aberrations to be minimized. When the lower limit is exceeded, as this means that the refractive power of the second lens unit is too strong, it becomes easy to reduce the size of the entire lens system, but the Petzval sum increases in the negative direction, causing the field curvature to increase. Moreover, the range of variation of aberrations with zooming is increased. When the refractive power of the second lens unit is too weak as exceeding the upper limit, lesser variation of aberrations with zooming results, but the required movement of the second lens unit for the predetermined zoom ratio increases to increase the total length of the zoom lens objectionably.

According to the invention, in order to reduce the number of lens elements, it is preferable to introduce aspheric surfaces into the lens units, particularly, into the third lens unit and the fourth lens unit.

Next, the numerical examples 1 to 4 of the invention are shown with the numerical data in the tables, where ri is the radius of curvature of the i-th surface when counted from the object side, di is the i-th lens thickness or air separation when counted from the object side, and ni and vi are respectively the refractive index and Abbe number of the glass of the i-th lens element when counted from the object side.

In the numerical examples 1 to 4, the nearest two surfaces to the image plane show an optical filter, face plate or the like, but these may be omitted as necessity arises.

The shape of the aspheric surface is expressed in the coordinates with an X axis in the axial direction and an H axis in the direction perpendicular to the octical axis, the direction in which light advances being taken as positive, by the following equation:

$$X = \frac{(1/R)H^2}{1+\sqrt{1-(1+k)(H/R)^2}} + BH^4 + CH^6 + DH^8 + EH^{10}$$

where R is the radius of the osculating sphere, and B, C, D, E and F are the aspheric coefficients.

The values of the factors of the conditions for the numerical examples 1 to 4 are listed in Table-1.

TABLE 1

| Ex. | Lv/Fw | L1/Fw | v | S1/Fw | F2/√Fw·Ft | β5 |
|---|---|---|---|---|---|---|
| 1 | 2.400 | 11.889 | 0.236 | 9.489 | 0.352 | — |
| 2 | 1.238 | 8.838 | 0.270 | 7.597 | 0.315 | 1.416 |
| 3 | 2.118 | 13.005 | 0.280 | 10.887 | 0.347 | — |
| 4 | 2.125 | 9.569 | 0.295 | 7.443 | 0.345 | — |

(Numerical Example 1)

f = 1–16.10  Fno = 1.65–2.69  2ω = 59.9°–4.1°

| | | | |
|---|---|---|---|
| R1 = 10.640 | D1 = 0.31 | N1 = 1.846660 | v1 = 23.8 |
| R2 = 5.831 | D2 = 1.20 | N2 = 1.603112 | v2 = 60.7 |
| R3 = −544.722 | D3 = 0.05 | | |
| R4 = 5.611 | D4 = 0.75 | N3 = 1.696797 | v3 = 55.5 |
| R5 = 15.848 | D5 = Variable | | |
| R6 = 12.000 | D6 = 0.14 | N4 = 1.772499 | v4 = 49.6 |
| R7 = 1.259 | D7 = 0.59 | | |
| R8 = −3.160 | D8 = 0.14 | N5 = 1.696797 | v5 = 55.5 |
| R9 = 3.752 | D9 = 0.18 | | |
| R10 = 2.989 | D10 = 0.38 | N6 = 1.846660 | v6 = 23.8 |
| R11 = 23.084 | D11 = Variable | | |
| R12 = Stop | D12 = 0.26 | | |
| R13* = 4.792 | D13 = 0.99 | N7 = 1.583126 | v7 = 59.4 |
| R14 = −2.281 | D14 = 0.14 | N8 = 1.834000 | v8 = 37.2 |
| R15 = −4.261 | D15 = 0.12 | | |
| R16 = ∞ | D16 = 0.19 | N9 = 1.523000 | v9 = 58.6 |
| R17 = ∞ | D17 = 0.71 | N9 = 1.416500 | v9 = 52.2 |
| R18 = ∞ (**) | D18 = 0.19 | N9 = 1.523000 | v9 = 58.6 |
| R19 = ∞ | D19 = Variable | | |
| R20 = 2.917 | D20 = 0.14 | N9 = 1.805181 | v9 = 25.4 |
| R21 = 1.626 | D21 = 0.81 | N10 = 1.583126 | v10 = 59.4 |
| R22* = −7.491 | D22 = 0.71 | | |
| R23 = ∞ | D23 = 0.82 | N11 = 1.516330 | v11 = 64.2 |
| R24 = ∞ | | | |

| Variable | Focal Length | | |
|---|---|---|---|
| Separation | 1.00 | 5.98 | 16.10 |
| D5 | 0.21 | 4.36 | 5.53 |
| D11 | 5.60 | 1.45 | 0.28 |
| D19 | 2.17 | 0.95 | 2.17 |

Aspheric Coefficients:

R13:  k = −3.28284e + 00  B = 1.12399e − 03  C = −6.24228e − 04
      D = 4.22206e − 04  E = −5.08736e − 05

R22:  k = −2.43818e + 01  B = 1.04644e − 02  C = 2.24937e − 03
      D = 1.53363e − 04  E = 0.0000e + 00

(Numerical Example 2)

f = 1–12.11  Fno = 1.85–2.53  2ω = 60.5°–5.5°0

| | | | |
|---|---|---|---|
| R1 = 19.036 | D1 = 0.18 | N1 = 1.846660 | v1 = 23.8 |
| R2 = 4.937 | D2 = 1.07 | N2 = 1.696797 | v2 = 55.5 |
| R3 = −19.999 | D3 = 0.04 | | |
| R4 = 4.320 | D4 = 0.64 | N3 = 1.834807 | v3 = 42.7 |
| R5 = 11.146 | D5 = Variable | | |
| R6 = 11.105 | D6 = 0.12 | N4 = 1.882997 | v4 = 40.8 |
| R7 = 1.228 | D7 = 0.52 | | |
| R8 = −1.547 | D8 = 0.12 | N5 = 1.658441 | v5 = 50.9 |
| R9 = 1.804 | D9 = 0.45 | N6 = 1.846659 | v6 = 23.8 |
| R10 = −10.120 | D10 = Variable | | |
| R11* = 2.412 | D11 = 0.49 | N7 = 1.487490 | v7 = 70.2 |
| R12 = −11.439 | D12 = 0.17 | | |
| R13 = Stop | D13 = 0.38 | | |

TABLE 1-continued

| | | | |
|---|---|---|---|
| R14 = ∞ | D14 = 0.19 | N8 = 1.523000 | ν8 = 58.6 |
| R15 = ∞ | D15 = 0.67 | N8 = 1.416500 | ν8 = 52.2 |
| R16 = ∞ (**) | D16 = 0.19 | N8 = 1.523000 | ν8 = 58.6 |
| R17 = ∞ | D17 = Variable | | |
| R18 = 1.575 | D18 = 0.12 | N8 = 1.546660 | ν8 = 23.8 |
| R19 = 0.936 | D19 = 0.79 | N9 = 1.669100 | ν9 = 55.4 |
| R20* = −8.267 | D20 = Variable | | |
| R21* = −4.130 | D21 = 0.14 | N10 = 1.669100 | ν10 = 55.4 |
| R22* = 9.475 | D22 = 0.18 | | |
| R23 = ∞ | D23 = 0.83 | N11 = 1.516330 | ν11 = 64.2 |
| R24 = ∞ | | | |

| Variable | Focal Length | | |
|---|---|---|---|
| Separation | 1.00 | 5.15 | 12.11 |
| D5 | 0.19 | 2.92 | 3.69 |
| D10 | 3.61 | 0.89 | 0.12 |
| D17 | 1.13 | 0.63 | 1.13 |
| D20 | 0.21 | 0.71 | 0.21 |

Aspheric Coefficients:

R11: k = −4.74807e + 00  B = 2.77708e − 02  C = 1.14986e − 02
     D = 3.39503e − 03  E = −1.84323e − 04
R20: k = −4.40703e + 02  B = −3.04198e − 02  C = 7.08406e − 02
     D = −6.14165e − 02  E = 0.00000e + 00
R21: k = −1.21682e + 02  B = 2.78408e − 01  C = −1.44633e − 01
     D = 0.00000e + 00  E = 0.00000e + 00
R22: K = 1.08476e + 02  B = 4.49553e − 01  C = −2.50510e − 01
     D = 6.58503e − 02  E = 0.00000e + 00

(Numerical Example 3)

f = 1–19.95    Fno = 1.66–3.70    2ω = 62.2°–3.5°

| | | | |
|---|---|---|---|
| R1 = 15.042 | D1 = 0.32 | N1 = 1.846659 | ν1 = 23.8 |
| R2 = 7.804 | D2 = 0.05 | | |
| R3 = 8.213 | D3 = 1.05 | N2 = 1.603112 | ν2 = 60.7 |
| R4 = −47.054 | D4 = 0.04 | | |
| R5 = 6.163 | D5 = 0.79 | N3 = 1.603112 | ν3 = 60.7 |
| R6 = 20.829 | D6 = Variable | | |
| R7 = 11.830 | D7 = 0.15 | N4 = 1.882997 | ν4 = 40.8 |
| R8 = 1.644 | D8 = 0.59 | | |
| R9 = −2.540 | D9 = 0.15 | N5 = 1.772499 | ν5 = 49.6 |
| R10 = 3.782 | D10 = 0.21 | | |
| R11 = 4.262 | D11 = 0.44 | N6 = 1.846659 | ν6 = 23.8 |
| R12 = −9.296 | D12 = Variable | | |
| R13 = Stop | D13 = 0.32 | | |
| R14 = 23.655 | D14 = 0.62 | N7 = 1.669100 | ν7 = 55.4 |
| R15* = −5.538 | D15 = 0.25 | | |
| R16 = ∞ | D16 = 0.20 | N8 = 1.523000 | ν8 = 58.6 |
| R17 = ∞ | D17 = 0.74 | N8 = 1.416500 | ν8 = 52.2 |
| R18 = ∞ (**) | D18 = 0.20 | N8 = 1.523000 | ν8 = 58.6 |
| R19 = ∞ | D19 = 0.69 | | |
| R20 = 8.022 | D20 = 0.89 | N8 = 1.693501 | ν8 = 53.2 |
| R21 = −2.408 | D21 = 0.17 | N9 = 1.846659 | ν9 = 23.8 |
| R22 = −5.664 | D22 = Variable | | |
| R23 = −3.002 | D23 = 0.49 | N10 = 1.846659 | ν10 = 23.8 |
| R24 = −2.174 | D24 = 0.17 | N11 = 1.583126 | ν11 = 59.4 |
| R25* = 6.656 | D25 = Variable | | |
| R26 = −9.673 | D26 = 0.54 | N12 = 1.583126 | ν12 = 59.4 |
| R27* = −2.719 | D27 = 0.05 | | |
| R28 = 2.483 | D28 = 0.15 | N13 = 1.846659 | ν13 = 23.8 |
| R29 = 1.518 | D29 = 1.01 | N14 = 1.622992 | ν14 = 58.1 |
| R30 = 6.158 | D30 = 0.49 | | |
| R31 = ∞ | D31 = 0.91 | N15 = 1.516330 | ν15 = 64.2 |
| R32 = ∞ | | | |

| Variable | Focal Length | | |
|---|---|---|---|
| Separation | 1.00 | 7.33 | 19.95 |
| D6 | 0.23 | 5.37 | 6.82 |
| D12 | 6.88 | 1.74 | 0.30 |
| D22 | 0.62 | 2.49 | 0.62 |
| D25 | 2.52 | 0.65 | 2.52 |

TABLE 1-continued

Aspheric Coefficients:

R15: k = −9.54257e − 01  B = 3.08868e − 04  C = 4.12657e − 05
     D = −2.62894e − 05  E = 0.00000e + 00
R25: k = −8.04143e + 00  B = 1.28861e − 03  C = −8.89181e − 04
     D = 0.00000e + 00  E = 0.00000e + 00
R27: k = −2.1300e − 02  B = 4.90698e − 03  C = 7.38385e − 04
     D = 7.14546e − 05  E = −3.33997e − 05

(Numerical Example 4)

f = 1–12.20    Fno = 1.65–2.45    2 = 59.5°–5.4°

| | | | |
|---|---|---|---|
| R1 = 8.662 | D1 = 0.25 | N1 = 1.846660 | ν1 = 23.8 |
| R2 = 4.631 | D2 = 1.00 | N2 = 1.603112 | ν2 = 60.7 |
| R3 = −438.910 | D3 = 0.04 | | |
| R4 = 4.598 | D4 = 0.64 | N3 = 1.712995 | ν3 = 53.8 |
| R5 = 14.935 | D5 = Variable | | |
| R6 = 12.015 | D6 = 0.13 | N4 = 1.772499 | ν4 = 49.6 |
| R7 = 1.196 | D7 = 0.53 | | |
| R8 = −2.657 | D8 = 0.11 | N5 = 1.696797 | ν5 = 56.5 |
| R9 = 2.778 | D9 = 0.18 | | |
| R10 = 2.742 | D10 = 0.30 | N6 = 1.846660 | ν6 = 23.8 |
| R11 = 25.258 | D11 = Variable | | |
| R12 = Stop | D12 = 0.21 | | |
| R13* = 4.246 | D13 = 0.80 | N7 = 1.583126 | ν7 = 59.4 |
| R14 = −2.073 | D14 = 0.13 | N8 = 1.834000 | ν8 = 37.2 |
| R15 = −3.846 | D15 = 0.14 | | |
| R16 = ∞ | D16 = 0.18 | N9 = 1.523000 | ν9 = 58.6 |
| R17 = ∞ | D17 = 0.66 | N9 = 1.416500 | ν9 = 52.2 |
| R18 = ∞ (**) | D18 = 0.18 | N9 = 1.523000 | ν9 = 58.6 |
| R19 = ∞ | D19 = Variable | | |
| R20 = 2.538 | D20 = 0.13 | N9 = 1.805181 | ν9 = 25.4 |
| R21 = 1.433 | D21 = 0.77 | N10 = 1.583126 | ν10 = 59.4 |
| R22* = −6.148 | D22 = 0.54 | | |
| R23 = ∞ | D23 = 0.80 | N11 = 1.516330 | ν11 = 64.2 |
| R24 = ∞ | | | |

| Variable | Focal Length | | |
|---|---|---|---|
| Separation | 1.00 | 5.23 | 12.20 |
| D5 | 0.19 | 3.20 | 4.05 |
| D11 | 4.08 | 1.06 | 0.21 |
| D19 | 1.88 | 0.94 | 1.88 |

Aspheric Coefficients:

R13: k = −3.38534e + 00  B = 6.04940e − 04  C = 6.23574e − 04
     D = −7.45221e − 04  E = 3.68847e − 04
R22: k = 5.05725e + 00  B = 7.86776e − 03  C = 1.73954e − 03
     D = −1.76403e − 03  E = 0.00000e + 00

*Aspheric Surface
(**) The driven surface of the variable angle prism unit.

The foregoing embodiments have been described as applied to the zoom lens in which a plurality of separations between adjacent two of the lens units are variable. It is also possible to apply the invention to other types of zoom lenses. For example, two lens units constitute the entire system and move in different loci at the same time. In this case, the stop is necessarily disposed in between the first lens unit and the second lens unit and the variable angle prism unit takes its place behind the stop.

According to the invention, as described above, the conditions or rules are set forth for the space the variable angle prism unit occupies and the refractive power arrangement of the lens units before the variable angle prism unit, thus making it possible to achieve a zoom lens having the image stabilizing function with the entire lens system minimized in bulk and size, while still permitting a good correction of aberrations throughout the entire zooming range.

I claim:

1. A zoom lens having an image stabilizing function, comprising a plurality of lens units, in which at least one of lens unit separations in said plurality of lens units is varied to vary a focal length, an aperture stop, and a variable angle prism unit disposed on an image side of said aperture stop and having an apex angle varied to refract light, said zoom lens satisfying the following conditions:

$$1.16 < Lv/Fw < 3.90$$

$$6.2 < L1/Fw < 17.0$$

where Lv is a distance between said aperture stop and a driven surface of said variable angle prism unit, Fw is a focal length in a wide-angle end of said zoom lens, and L1 is a distance between the driven surface of said variable angle prism unit and a lens surface closest to an object side in said zoom lens.

2. A zoom lens according to claim 1, further satisfying the following condition:

$$0.15 < \gamma < 0.45$$

where $\gamma = \theta 2/\theta 1$, wherein $\theta 1$ is an angle of incidence on said variable angle prism unit of a ray of light which passes through a center of said variable angle prism unit and advances in parallel to an optical axis, $\theta 2$ is an angle of incidence of said ray of light on said lens surface closest to the object side in said zoom lens, and $\gamma$ is a ratio of the angle $\theta 2$ to the angle $\theta 1$.

3. A zoom lens according to claim 1 or 2, further satisfying the following condition:

$$5.0 < S1/Fw < 15.0$$

where S1 is a distance between said lens surface closest to the object side in said zoom lens and said aperture stop.

4. A zoom lens according to claim 1, wherein said plurality of lens units includes, in order from the object side, a first lens unit having a positive refractive power, a second lens unit having a negative refractive power, a third lens unit having a positive refractive power and a fourth lens unit having a positive refractive power, and wherein said variable angle prism unit is disposed between said third lens unit and said fourth lens unit, the focal length is varied by moving at least said second lens unit and said fourth lens unit, and focusing is performed by moving said fourth lens unit.

5. A zoom lens according to claim 1, wherein said plurality of lens units include, in order from the object side, a first lens unit having a positive refractive power, a second lens unit having a negative refractive power, a third lens unit having a positive refractive power, a fourth lens unit having a positive refractive power and a fifth lens unit having a negative refractive power, and wherein said variable angle prism unit is disposed between said third lens unit and said fourth lens unit, the focal length is varied by moving at least said second lens unit and said fourth lens unit, and focusing is performed by moving said fourth lens unit.

6. A zoom lens according to claim 1, wherein said plurality of lens units includes, in order from the object side, a first lens unit having a positive refractive power, a second lens unit having a negative refractive power, a third lens unit having a positive refractive power, a fourth lens unit having a negative refractive power and a fifth lens unit having a positive refractive power, and wherein the focal length is varied by moving at least said second lens unit and said fourth lens unit, and focusing is performed by moving said fourth lens unit.

7. A zoom lens according to claim 6, wherein said variable angle prism unit is disposed inside said third lens unit.

8. A zoom lens according to claim 4, 5 or 6, further satisfying the following condition:

$$0.2 < |F2/\sqrt{Fw \cdot Ft}| < 0.45$$

where F2 is a focal length of said second lens unit, and Ft is a focal length in a telephoto end of said zoom lens.

* * * * *

UNITED STATES PATENT AND TRADEMARK OFFICE
CERTIFICATE OF CORRECTION

PATENT NO. : 5,771,123

DATED : June 23, 1998

INVENTOR(S) : HIROYUKI HAMANO

It is certified that error appears in the above-identified patent and that said Letters Patent is hereby corrected as shown below:

IN THE DRAWINGS:

SHEET 7:

FIG. 7C-4, "ATERAL" should read --LATERAL--.

SHEET 8:

FIG. 8C-2, "ASTGMATISM" should read --ASTIGMATISM--.

SHEET 9:

FIG. 9A-3, "DISTRTION" should read --DISTORTION--.

COLUMN 6:

Line 40, "tis" should read --t is--.

UNITED STATES PATENT AND TRADEMARK OFFICE
CERTIFICATE OF CORRECTION

PATENT NO.   : 5,771,123
DATED        : June 23, 1998
INVENTOR(S)  : HIROYUKI HAMANO It is certified that error appears in the above-identified patent and that said Letters Patent is hereby corrected as shown below:

<u>COLUMN 7</u>:

Line 3, "c/" should read --$\theta$c/--.

<u>COLUMN 10</u>:

Line 55, "5.5°o" should read --5.5°--.

<u>COLUMN 12</u>:

Line 11, "2=" should read --2$\omega$=--.

Signed and Sealed this

Eleventh Day of May, 1999

Attest:

Q. TODD DICKINSON

*Attesting Officer*    *Acting Commissioner of Patents and Trademarks*